(12) United States Patent
Móráin et al.

(10) Patent No.: US 7,797,343 B2
(45) Date of Patent: Sep. 14, 2010

(54) SYSTEM AND METHOD FOR PROVIDING USAGE METRICS OF DIGITAL CONTENT

(75) Inventors: Pól Ó Móráin, London (GB); Mathieu Chuat, Meylan (FR)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 10/748,050

(22) Filed: Dec. 30, 2003

(65) Prior Publication Data
US 2004/0199527 A1 Oct. 7, 2004

Related U.S. Application Data

(60) Provisional application No. 60/455,466, filed on Mar. 17, 2003.

(51) Int. Cl.
*G06F 17/00* (2006.01)
(52) U.S. Cl. .................. 707/791; 707/792; 707/795
(58) Field of Classification Search ............... 707/3, 707/100, 104.1, 791, 792, 795; 705/14, 26; 702/179
See application file for complete search history.

(56) References Cited

U.S. PATENT DOCUMENTS

| | | | |
|---|---|---|---|
| 5,790,426 A | | 8/1998 | Robinson |
| 5,842,199 A | | 11/1998 | Miller et al. |
| 5,884,282 A | | 3/1999 | Robinson |
| 6,016,475 A | | 1/2000 | Miller et al. |
| 6,321,179 B1 | | 11/2001 | Glance et al. |
| 6,327,590 B1 | | 12/2001 | Chidlovskii et al. |
| 6,353,929 B1 | * | 3/2002 | Houston ............... 725/20 |
| 6,389,372 B1 | | 5/2002 | Glance et al. |
| 6,466,915 B1 | * | 10/2002 | Suzuki et al. ........... 705/14 |
| 6,487,538 B1 | * | 11/2002 | Gupta et al. ........... 705/14 |
| 6,507,727 B1 | * | 1/2003 | Henrick ............. 455/3.06 |
| 6,810,356 B1 | * | 10/2004 | Garcia-Franco et al. ..... 702/179 |
| 6,847,969 B1 | * | 1/2005 | Mathai et al. ........... 707/100 |
| 6,871,012 B1 | * | 3/2005 | Evans ................. 386/125 |
| 7,165,105 B2 | * | 1/2007 | Reiner et al. ........... 709/224 |

(Continued)

FOREIGN PATENT DOCUMENTS

JP 11134345 A 5/1999

(Continued)

OTHER PUBLICATIONS

"Net Perceptions" Introductory Web page [retrieved from the Internet at http://www.netperceptionscom/index.php on Dec. 22, 2003].

(Continued)

*Primary Examiner*—Sana Al-Hashemi (57) ABSTRACT

A system and method is disclosed for providing usage metrics of digital content. The system includes one or more clients, such as a computer and an audio player device, a usage metrics server and an optional recommendation system, which are connected together by a network, such as the Internet. A consumer or user at a client system, such as the computer, downloads digital content from a content provider. As the client consumes the digital content, a tracking system operating on the client uploads usage data to the usage metrics system. The usage metrics system processes the usage data and stores the processed data in a storage for subsequent retrieval to provide the data to a content provider, the optional recommendation system and/or third party systems.

24 Claims, 4 Drawing Sheets

U.S. PATENT DOCUMENTS

2002/0116291 A1    8/2002    Grasso et al.

FOREIGN PATENT DOCUMENTS

| JP | 2001297093 A | 10/2001 |
|---|---|---|
| JP | 2002149693 A | 5/2002 |
| JP | 2002223418 A | 8/2002 |
| JP | 2003069912 A | 3/2003 |

OTHER PUBLICATIONS

"LikeMinds" Introductory Web page [retrieved from the Internet at http://www.likeminds.com on Dec. 22, 2003].

"DirectHit" Introductory Web page [retrieved from the Internet at http://www.directhit.com on Dec. 22, 2003].

"SavageBeast" Introductory Web page [retrieved from the Internet at http://www.savagebeast.com on Dec. 22, 2003].

"MediaUnbound" Introductory Web page [retrieved from the Internet at http://www.mediaunbound.com/index.jsp on Dec. 22, 2003].

Caruso, D., "In the quest to sort through a sea of Web data, a sudden flash of light," The New York Times, Section D, p. 3, col. 3 (1996).

Konstan et al., "GroupLens: Applying Collaborative Filtering to Usenet News," *Communications of the ACM*, 40: 3, pp. 77-87 (1997).

Schafer et al., "Recommender Systems in E-Commerce", *Proceedings of the 1999 ACM Conference on Electronic Commerce*, Denver, Colorado (1999).

Morita et al., "Information Filtering Based on User Behavior Analysis and Best Match Text Retrieval," *Proceedings of the SIGIR '04*, Dublin, Ireland, pp. 272-281 (1994).

Nicholas D., "Implicit Rating and Filtering", *DELOS Workshop on Filtering and Collaborative Filtering*, Budapest, Hungary (1997), retrieved from the Internet at http://www.ercim.org/publication/ws-proceedings/DELOS5/nichols.ps.gz on Dec. 22, 2003].

Shardanand et al., "Social Information Filtering: Algorithms for Automating Word of Mouth", *Proceedings of the ACM 1995 Conference on Computer Human Interactions*, Denver, CO., pp. 210-217 (1995).

\* cited by examiner

SYSTEM AND METHOD FOR PROVIDING USAGE METRICS OF DIGITAL CONTENT

This application claims the benefit of U.S. Provisional Patent Application Ser. No. 60/455,466 filed on Mar. 17, 2003, which is herein incorporated by reference.

FIELD

This invention relates generally to systems that monitor consumption of goods and services and, more particularly, to a method and system for collecting usage metrics of digital content.

BACKGROUND

In a market economy, there are many reasons why it is important to measure or track the consumption of goods and services. For instance, shampoo producers may want to obtain sales data from supermarket retailers in order to deduce how often people replenish their stock of shampoo in their homes. This information may be useful to the shampoo producers since they can use it to estimate demand during production planning. Monitoring the consumption of goods and services is useful in a variety other settings as well. For instance, television networks measure television usage metrics to determine which shows are being watched by users and which are not.

Unlike tangible goods like shampoo, determining the consumption of digital content, such as digital music, has been difficult. There has been no easy way to measure the consumption of digital content once it has been received by the consumer. In particular, it is uncommon for the same digital content to be repurchased by the same consumer, whereas the same type of shampoo will have a greater likelihood of being repurchased by the same consumer. Further, the fact that digital content is downloaded onto a device does not mean that the user has consumed the downloaded content. For instance, where the downloaded content is music, currently there is no easy way to find out whether the user has actually listened to the downloaded music.

Current systems for tracking digital content usage focus on download statistics. This is unfortunate since the music industry, for example, is a high value market, where promotion and product launch are very high cost exercises. Music is advertised through radio, television and printed media, and success is measured by the number of unit sales. But other than bottom line sales data, there are very few indicators that the music industry can rely on to determine what consumers' likes and dislikes are since there is no easy way to monitor the product consumption.

SUMMARY

A system in accordance with embodiments of the present invention includes a monitoring system that monitors consumption of digital content at a first device. Further, a usage data storage system collects usage data of the monitored consumption of the digital content at the first device, and a usage metrics system processes the usage data to provide usage results to a second device.

A method and a program storage device readable by a machine and tangibly embodying a program of instructions executable by the machine in accordance with embodiments of the present invention include monitoring consumption of digital content at a first device, collecting usage data of the monitored consumption of the digital content at the first device, and processing the usage data to provide usage results to a second device.

The embodiments of the present invention provide a system and method that enables measuring usage metrics for digital content, such as digital music, which is useful for content providers, content publishers, content developers, the advertising industry and organizations who have pecuniary or other interests in products or services available with digital devices. The present invention measures usage metrics, such as consumption of and user interaction, with downloaded content on a digital device after it has been downloaded to the device.

The system in accordance with embodiments of the present invention also provides insights into the consumption of content. Further, the usage data may be used by analysis systems, such as recommendation systems, to improve content and for creating new or innovative business solutions. The present invention may be used to measure content consumption for digital music on digital devices, such as PDA's, personal computers, notebook computers, mobile phones or digital televisions, for example.

The present invention can also be used for measuring usage metrics and user interactions with other content on digital devices, such as educational or training material, news feeds, personalized information services, streaming radio, stock tracking, and business data. The invention addresses the lack of current technology to measure the usage metrics of digital content on digital devices, and independently monitors actual listening histories and music preferences regardless of where consumers are physically located while interacting with the content.

Additionally, the systems in accordance with embodiments of the present invention enables usage metrics measurement and analysis in a non-intrusive manner and provides a range of data that would not otherwise be possible to collect. Further, the system requires no effort on the part of the user and requires no change of habit. The present invention also reduces market, financial and investment risks by providing digital content usage data which enables understanding reactions to new music and artists both pre-launch and post-launch. Furthermore, the present invention offers a way to enable more personalized marketing with substantially lower costs, and shortens the product life cycle in the music industry, for example. Shortening the life-cycle in the music industry would facilitate more releases per artist/group over the lifetime of the artist/group.

DETAILED DESCRIPTION

Figure 1:
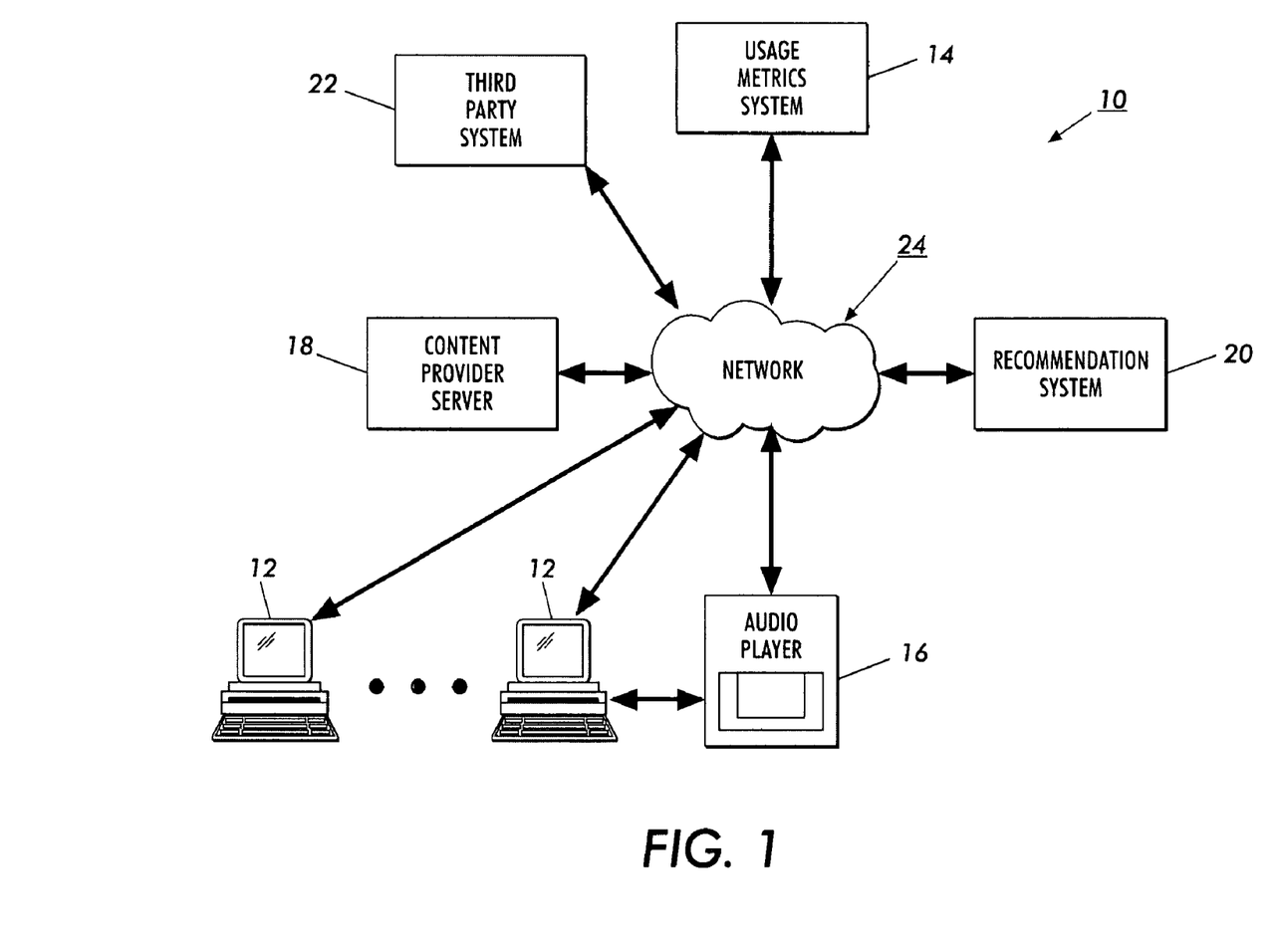
FIG. 1 is a block diagram of a system for providing usage metrics of digital content in accordance with embodiments of the present invention.

A system 10 for providing usage metrics of digital content in accordance with embodiments of the present invention is illustrated in FIG. 1. The system 10 includes one or more clients, such as computers 12(1), 12(2), a usage metrics server 14, a content provider server 18, an optional recommendation system 20 and third party system 22, which are connected together by a network 24. The system 10 enables measuring usage metrics for digital content, such as digital music, which is useful for content provider servers 18 and/or third party systems 22. Further, the system 10 provides usage metrics representing the consumption of and user interaction with downloaded content after it has been downloaded to a client to be used as desired by content provider server 18 and/or recommendation system 20.

Figure 2:
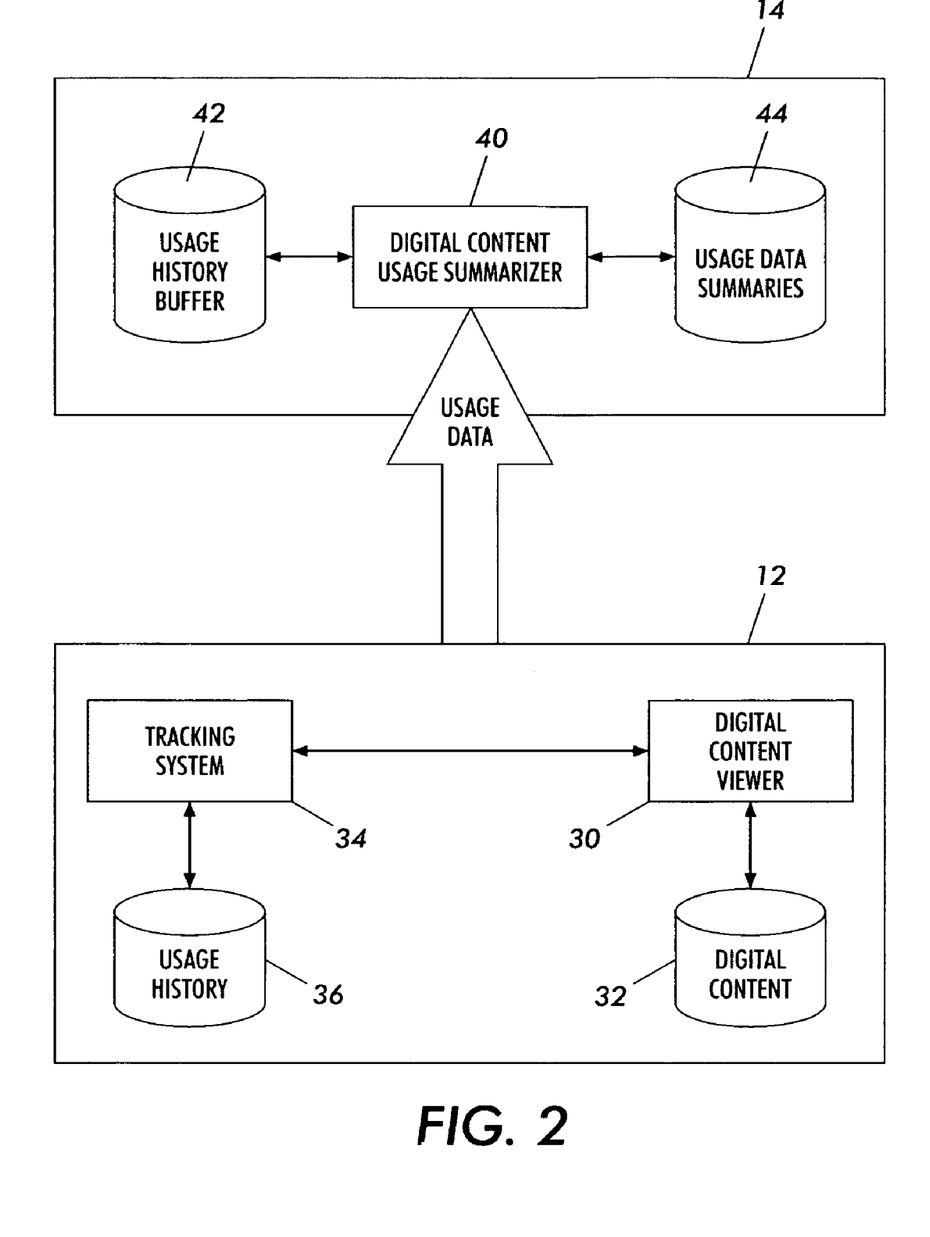
FIG. 2 is a functional block diagram of a portion of a system for providing usage metrics of digital content in accordance with embodiments of the present invention.
Figure 3:
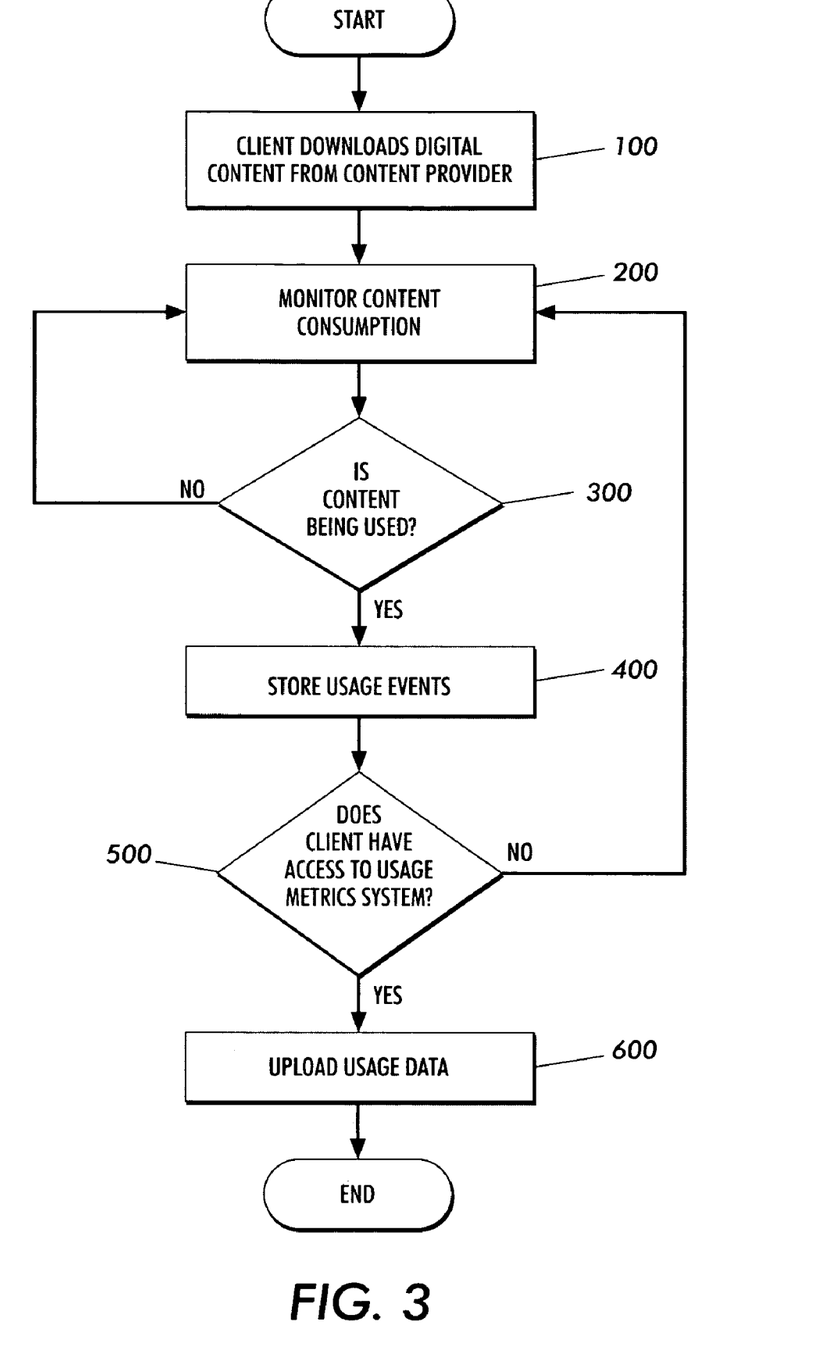
FIGS. 3-4 are flow charts of processes for providing usage metrics of digital content in accordance with embodiments of the present invention.
Figure 4:
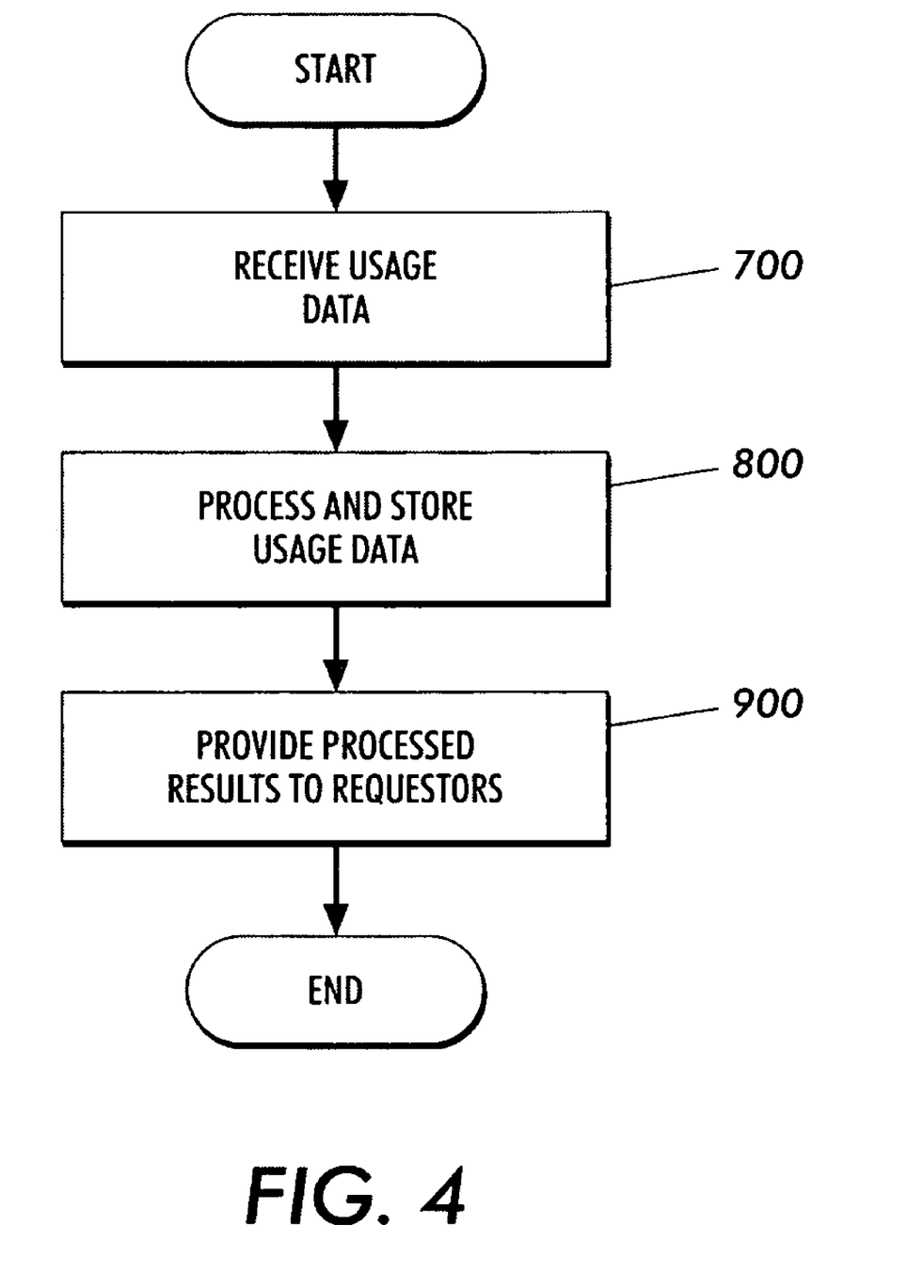

Referring more specifically to FIGS. 1 and 2, computers 12(1), 12(2) each include memory, a processor, an I/O unit, user input devices, such as a keyboard and a mouse, and a display device, which are coupled together by one or more buses, although other coupling techniques and other types and numbers of components may be used. The memory stores instructions and data for performing one or more aspects of the present invention for execution by the processor, such as a process for providing usage metrics of digital content as shown in FIGS. 3-4, although some or all of these instructions and data may be stored elsewhere, such as at a server.

In embodiments of the present invention, the computers 12(1), s 12(2) each has stored in its respective memory instructions for implementing by the processor one or more modules and memory allocations, such as a digital content viewer 30, digital content database 32, tracking system 34 and a usage history database 36. The processor of each computer 12(1), 12(2) manages these modules to perform their functions as described herein. In particular, the digital content viewer 30 retrieves stored digital content, such as audio files, from a digital content storage 32, and can "play" the files.

The computers 12(1), 12(2) obtain digital content, such as one or more audio files in an MP3 format, although the computers may obtain audio files in other formats, such as in a WAV format, from a source on the network 24, such as the content provider server 18. The tracking system 34 monitors the digital content viewer 30 as it consumes the digital content. The usage history storage 36 stores usage data obtained by the tracking system 34 monitoring the digital content viewer 30, although the storage 36 may include usage data provided to the computer 12(2) by an audio player 16, for example. These modules are illustrated based on their function for exemplary and clarity purposes only, and do not necessarily represent specific hardware or software, although these modules may be hardware and/or software implemented to substantially perform the particular functions described herein.

Further, the computers 12(1), 12(2) are each configured to operate a standard Web browser application, such as Internet Explorer™, which are used by the computers 12(1), 12(2) to display and transmit data through, although other types of browser applications may be used including Netscape Navigator™ or Opera™. The computers 12(1), 12(2) are configured to allow users to request Web pages from a source on the network 24, such as a content provider server 18, and further, to display the pages. Further, the Web pages can be accessed by a user at the computers 12(1), 12(2) for downloading digital content, such as audio files, from the content provider server 18, although other types of digital content may be downloaded and used in embodiments of the present invention, such as text files, e-books, video format files, multimedia, pictures, executable code, software or any combination thereof.

The I/O unit in each computer 12(1), 12(2) is connected to the network 24 and has one or more ports capable of sending and receiving data to and from the network 24, and hence devices on the network 24, such as the usage metrics system 14. Further, the I/O unit has one or more ports capable of sending and receiving data to and from other devices directly, such as audio player 16.

The usage metrics system 14 includes memory, a processor, and an I/O unit, which are coupled together by one or more buses, although other types and numbers of components and other coupling techniques may be used. The memory stores instructions and data for performing one or more aspects of the present invention, such as a process for providing usage metrics of digital content as shown in FIGS. 3-4, for execution by the processor, although some or all of these instructions and data may be stored elsewhere.

In embodiments of the present invention, the usage metrics system 14 has stored in its respective memory instructions for implementing by the processor one or more modules and memory allocations, such as a digital content summarizer 40 that processes received raw usage data, a usage history buffer 42 that stores received raw usage data, and a data summaries storage 44 that stores processed usage data. These modules are illustrated based on their function for exemplary and clarity purposes only, and do not necessarily represent specific hardware or software, although these modules may be hardware and/or software implemented to substantially perform the particular functions described herein.

The usage metrics I/O unit is connected to the network 24 and has one or more ports capable of sending and receiving data, such as usage data, to and from the network 24.

The optional audio player 16 stores and plays digital audio files in an MP3 file format, although the player 16 may store and play other types of audio file formats, such as WAV formats. In particular, the player 16 includes a processor configured to retrieve the audio files from a memory in the player 16, and an I/O unit. The I/O unit includes one or more ports capable of interfacing with devices, such as one or more of computers 12(1), 12(2), via wireless signals to send and receive data, although cable mediums may be used. The player 16 sends usage history data to devices, such as computer 12(2), where it is stored in the usage history storage 36, although the player 16 may send the usage data directly to the usage metrics system 14 where the player 16 has access to the network 24. Further, the audio player 16 may be configured to implement the same modules and memory allocations as described above in connection with computers 12(1), 12(2).

The content provider server 18 includes memory, a processor, and an I/O unit, which are coupled together by one or more buses, although other types and numbers of components and other coupling techniques may be used. The memory stores instructions and data for performing one or more aspects of the present invention, such as a process for providing usage metrics of digital content as shown in FIGS. 3-4, for execution by the processor, although some or all of these instructions and data may be stored elsewhere. In embodiments of the present invention, the content provider server 18 stores digital content, such as audio files, which it provides to one or more devices with access to the network 24, such as computers 12(1), 12(2) and/or the audio player 16, although other types of digital content may be supplied by the content server 18, including text files, e-books, video format files, multimedia, pictures, executable code, software or any combination thereof. Further, the content server 18 may provide user interfaces, such as Web pages, to the devices to enable them to select the digital content for obtaining.

The optional recommendation system 20 comprises a system for providing recommendations, such as custom recommendations for individual users or classes of users, based on processed usage data of digital content received from the usage metrics system 14. Examples of recommendation systems are disclosed in co-pending U.S. application Ser. No. 09/746,917 to Grasso et al., filed Dec. 22, 2000, titled "RECOMMENDER SYSTEM AND METHOD"; U.S. Pat. No. 6,016,475 to Miller et al., issued Jan. 18, 2000, titled "SYSTEM, METHOD AND ARTICLE OF MANUFACTURE FOR GENERATING IMPLICIT RATINGS BASED ON RECEIVER OPERATING CURVES"; U.S. Pat. No. 5,842,199 to Miller et al., issued Nov. 24, 1998, titled "SYSTEM, METHOD, AND ARTICLE OF MANUFACTURE FOR USING RECEIVER OPERATING CURVES TO EVALUATE PREDICTIVE UTILITY"; U.S. Pat. No. 5,790,426 to Robinson, issued Aug. 4, 1998, titled "AUTOMATED COLLABORATIVE FILTERING SYSTEM"; and U.S. Pat. No. 6,327,590 B1 to Chidlovskii et al., issued Dec. 4, 2001, titled "SYSTEM AND METHOD FOR COLLABORATIVE RANKING OF SEARCH RESULTS EMPLOYING USER AND GROUP PROFILES DERIVED FROM DOCUMENT COLLECTION DOCUMENT ANALYSIS", all of which are incorporated herein by reference in their entirety.

The optional third party system 22 includes memory, a processor, and an I/O unit, which are coupled together by one or more buses, although other types and numbers of components and other coupling techniques may be used. The memory stores instructions and data for performing one or more aspects of the present invention, such as a process for providing usage metrics of digital content as shown in FIGS. 3-4, for execution by the processor, although some or all of these instructions and data may be stored elsewhere. In embodiments of the present invention, the third party system 22 represents a computer system managed by a music industry related company, such as a much charts company, marketing company, advertising company, content publisher, music event organizations, and consulting firms, for example.

The network 24 connects the computers 12(1), 12(2), usage metrics system 14, audio player 16, content provider server 18, optional recommendation system 20 and third party system 22 together to enable them to communicate with each other and any other devices with access to network 24 using a TCP/IP protocol, although other protocols may be used. In embodiments of the present invention, the network 24 comprises a public network, such as the Internet, although other types of public and/or private networks 24 may be used, including local area networks ("LANs"), wide area networks ("WANs"), telephone line networks, coaxial cable networks, wireless networks and combinations thereof.

While devices, such as computers 12(1), 12(2) and audio player 16, are illustrated, the system 10 may include a fewer or greater number of devices. Further, the computers 12(1), 12(2) and player 16 are provided for exemplary purposes only. In embodiments of the present invention, these devices may comprise other types of devices or systems that can store, process and execute instructions for performing one or more methods of the present invention as will be described in further detail herein. By way of example only, the devices shown in FIG. 1 may also comprise laptop computers, personal digital assistants, cellular telephones or other devices.

A portion of the operation of system 10 for providing usage metrics of digital content in accordance with embodiments of the present invention will now be described in connection with FIG. 3 with reference back to FIGS. 1 and 2. Referring more specifically to FIG. 3, beginning at step 100, users at one or more computers 12 download a Web page, for example, provided by the content server 18. The Web page provides the computer 12(1) user with one or more digital content selections. By way of example only, the user selects one or more digital content files, such as audio files, for downloading. The computer 12(1) receives the selected audio file(s) and stores the content in the digital content storage 32.

At step 200, the computer 12(1) tracking system 34 begins monitoring the digital content viewer 30 to detect when the viewer begins operating to play or consume the content, although the computer 12(1) processor may be configured to begin operating the tracking system 34 upon detecting that execution of the viewer 30 has been initiated by the user. By way of example only, the user at computer 12(1) may desire playing one of the stored audio files. Thus, computer 12(1) may provide the user with a user interface for operating the digital content viewer 30. In embodiments of the present invention, the content viewer 30 is a viewer application that is appropriate for the type of digital content that the user desires accessing. For instance, in this example the viewer 30 is an audio player device that can process audio files, such as a RealAudio™ player, although other player devices for different file formats may be used, such as MS Word™, where the content is a word processing file. The user may initiate execution of the viewer for playing a selected stored audio file using a user input device, such as a keyboard and/or mouse, for entering the appropriate selection information.

At decision box 300, if during the monitoring the tracking system 34 does not detect that the digital content viewer 30 is playing the downloaded digital content, then the NO branch is followed and the system 34 repeats step 200 to continue monitoring the content viewer 30 until the tracking system 34 detects that the viewer 30 is playing the content. Upon the system 34 detecting that the viewer 30 is playing the content, the YES branch is followed.

At step 400, the tracking system 34 stores usage events generated by the digital content viewer 30 during playing of the digital content. For example, the tracking system 34 monitors the viewer for "play" events associated with the content. A play event indicates to the tracking system 34 that the viewer 30 has performed a play function associated with some digital content, such as begin, pause, resume, complete and cancel play. The tracking system 34 stores this information in the usage history storage 36, which may comprise a relational database with key-value pairs. In particular, the usage data stored in the usage history 36 may be organized to have a user identification identifier as the key, along with associated values, such as the content type that is being played, the event value, such as begin play, and time/date values, although other keys may be used.

The content type values may be identified using an identifier for the type of viewer 30, such as an audio or a video viewer, or an identifier for the type of file format the content is in, such as WAV or AVI. Thus, for a particular user that is playing a particular type of digital content using the viewer 30, the system stores the usage data in the usage history 36 along with date/time stamp values representing when the user began playing the digital content, for example. Additionally, the tracking system 34 stores a content identifier value to identify the content. In this example where the digital content is an audio file, the content identifier value stored by the tracking system 34 in the usage history storage 36 is a song track id, although the identifier may be a digital object identifier, such as a document id, where the content is a digital document.

As the digital content viewer 30 plays the digital content, the tracking system 34 stores each usage event in the usage history storage 36, such as when the content is initially played as described above, or when the viewer 30 has completed playing the digital content. Further, additional usage events may be detected and stored in the usage history 36 by the tracking system 34, such as whether the digital content viewer 30 completed playing all of the digital content or whether playing was stopped prematurely or canceled, whether any errors were encountered during playing, or whether the playing was paused. Each time the digital content is played by the digital content viewer 30, the usage data is stored in the usage history storage 36 unbeknownst to user(s) of computer 12(1). Table 1 below shows exemplary usage data stored for digital content played by the viewer 30 in this example:

TABLE 1

| User | Play Event | Content Type | Content ID | Genre | Date | Time |
| --- | --- | --- | --- | --- | --- | --- |
| User1 | Begin | .wav | [00123] | Jazz | Dec. 6, 2002 | 12:06 pm |
| User1 | Pause | .wav | [00123] | Jazz | Dec. 6, 2002 | 12:07 pm |
| User1 | Resume | .wav | [00123] | Jazz | Dec. 6, 2002 | 12:17 pm |
| User1 | Complete | .wav | [00123] | Jazz | Dec. 6, 2002 | 12:20 pm |
| User1 | Begin | .rmi | [04545] | Classical | Dec. 6, 2002 | 12:21 pm |
| User1 | Complete | .rmi | [04545] | Classical | Dec. 6, 2002 | 12:26 pm |
| User1 | Begin | .rmi | [01222] | Classical | Dec. 7, 2002 | 10:01 pm |
| User1 | Complete | .rmi | [01222] | Classical | Dec. 7, 2002 | 10:06 pm |
| User1 | Begin | .wav | [03434] | Rap | Dec. 8, 2002 | 6:01 am |
| User1 | Cancel | .wav | [03434] | Rap | Dec. 8, 2002 | 6:02 am |
| User1 | Begin | .avi | [0qw44] | Science | Dec. 8, 2002 | 7:02 pm |
| User1 | Error | .avi | [0qw44] | Science | Dec. 8, 2002 | 7:02 pm |

Thus, in the exemplary usage data shown in table 1 above, the digital content viewer 30 played an audio file with a song track identifier "[00123]." Further, viewer 30 paused playing the audio file for several minutes, resumed play, and completed playing the audio file at 12:20 pm. The usage metrics system 14 will receive and use this exemplary usage data to generate usage data summaries as described in further detail herein below. Also, the viewer 30 played several other audio files, completing some and canceling others. Further, the exemplary usage data for a user shows that the viewer 30 produced an error play event when the viewer attempted to play a video file in an AVI file format.

At decision box 500, if the computer 12(1) does not have access to the network 24, then the NO branch is followed and steps 200-500 are repeated, although step 100 may also be repeated where the computer 12(1) user desires downloading additional digital content. But if the computer 12(1) has access to the network 24, then the YES branch is followed.

At step 600, once the computer 12(1) has access to the network 24, it uploads some or all of the contents of the usage history storage 36 to the usage metrics system 14, although the computer 12(1) may have continuous access to the network 24, and hence the usage metrics system 14. Where the computer 12(1) has continuous access to the network 24, the computer 12(1) may be configured to upload the usage data after a set amount of time has elapsed or upon particular events occurring. For example, the tracking system 34 may be configured to upload usage data associated with a particular piece of digital content that is stored in the usage history storage 36 upon the content having been played or cancelled during playing. Once the usage data has been uploaded to the usage metrics system 14, the process ends, although the computer 12(1) may be configured to repeat steps 100-600 until some condition is satisfied, such as when no usage data is present in the usage history storage 36 and/or there is no downloaded content present in the digital content storage 32. Still further, the computer 12(1) may be configured to repeats steps 100-600 continuously.

Another portion of the process for providing usage metrics of digital content in accordance with embodiments of the present invention will now be described in connection with FIG. 4 and with reference back to FIGS. 1-3. Steps 100-600 are performed and repeated as described above. Referring now to FIG. 4, and beginning at step 700, the digital content summarizer 42 in the usage metric system 14 receives raw usage data uploaded from the computer 12(1) as described above in connection with step 600, although the metric system 14 may receive the usage data from another source, such as a content broker.

At step 800, the digital content usage summarizer 40 stores the received raw usage data in a usage history buffer 42 for further processing as described herein, which is organized in the same manner as the usage history storage 36 described above. The digital content summarizer 40 processes the raw usage data and stores the processed usage data in the usage data summaries storage 44, which may comprise a relational database with key-value pairs described further herein below. In embodiments of the present invention, the usage data processing is performed upon the summarizer 40 detecting that new raw usage data has been received from the computer 12(1), although the summarizer 40 may be configured to examine the usage history buffer 42 for the presence of data upon set amounts of time elapsing.

In particular, the digital content usage summarizer 40 analyzes the raw usage data to make inferences based on the usage data received for each user. For instance, the raw usage data received for a "user1" from the computer 12(1), shown in table 1 above, and stored in the usage buffer 42, is analyzed to determine which music genre the user listens to most often. Thus, in this example, the summarizer 40 concludes that "user1" likes classical and jazz music based on the number of times music of that genre has been played by "user1". Further, the summarizer 40 may conclude that the user does not like rap music based on the user canceling the play event and taking into account how quickly the user canceled playing the audio file using the time stamp information. Further, the summarizer 40 may conclude that the viewer 30 of the computer 12(1) does not have the capability of playing video file formats based on the error play event that the viewer 30 generated.

Additionally, the summarizer 40 uses the time and date information for the digital content to draw conclusions with regard to usage patterns. For instance, the summarizer 40 may generate statistics on what time of day the user listens to music most often and/or what types or genres of music the user listens during certain times of day. Still further, the summarizer 40 may surmise that the particular user, such as "user1", is an avid music listener based on the date information, such as music play events that are recorded on a daily basis. These conclusions are stored by the digital content usage summarizer 40 in the usage data summaries storage 44. In embodiments of the present invention, the usage summaries storage 44 is organized to have the user identification identifier as the key, along with corresponding values including the most common music genre played by the user, a time of day when the user is most likely to play the music, the number of times the user plays a piece of music, such as a particular song, and whether the user is likely to play an entire song or cancel a song before it is done playing. In embodiments of the present invention, steps 700-800 are repeated for one or more users at computer 12(1) or at other devices. The summarizer 40 processes and stores usage data for the one or more users as described above.

At step 900, the usage metrics system 14 provides the processed usage data stored in the usage data summaries storage 44 to one or more requesters, such as the third party system and/or the content provider server 18. In embodiments of the present invention, the content provider server 18 and/or the third party systems 22 may use the processed usage data to plan the creation and/or delivery of content based on user music preferences gleaned from the raw usage data by the usage metrics system 14, and taking into account variables including date/time-related music preferences. Thus, the content provider server 18 may use this information to provide devices, such as the computer 12(1), with personalized digital content based on the user's past digital content consumption. Further, the content server 18 and/or the third party system 22 may meter existing and new music releases to enable exploitation of particular music genres or artists in a more proactive sense, thereby enhancing revenue streams by allowing demand and likelihood of success to be more accurately predicted.

In embodiments of the present invention, the usage metrics system 14 optionally provides the processed usage data stored in the usage data summaries storage 44 to the recommendation system 20. The recommendation system 20 further processes the processed usage data summaries to generate personalized digital content recommendations for the user associated with the usage data. The recommendation system 20 sends these recommendations to the content provider server 18 and/or the third party systems 22.

An alternative process for providing usage metrics of digital content in accordance with embodiments of the present invention will now be described with reference back to FIGS. 1-4. Steps 100-900 are performed as described above, except at step 100, the content provider server 18 also downloads to the usage metrics system 14 summaries of the digital content it is providing the computer 12(1), such as the user identifier and the content identifier for the digital content. The usage metrics system 14 stores the digital content summaries in a memory, such as a temporary memory buffer. Further, at step 800, the usage metrics system 14 compares the downloaded content summaries in the temporary buffer with the play events in the raw usage data stored in the usage data summaries storage 44 to determine whether the user has actually listened to the digital content provided by the content provider server 18. The usage metrics system 14 provides the results of whether the user has listened to the content using protocols and data formats understood by the content provider server 18. The content provider 18 uses these results to provide personalized digital content to devices operated by the user, such as the computer 12(1).

An alternative process for providing usage metrics of digital content in accordance with embodiments of the present invention will now be described with reference back to FIGS. 1-4. Steps 100-900 are performed in the same manner described above, except at step 100, the computer 12(2) retrieves the audio files instead of the computer 12(1). Further, the audio player 16 communicates with the computer 12(2) to retrieve the audio files from the computer 12(2), although the audio player may retrieve the audio files directly from a source on the network 24, such as the content provider 18, where the player 16 has access to the network 24. Thereafter, the audio player 16 performs steps 200-900 in the same manner described above in connection with computer 12(1).

The embodiments of the present invention provide a system 10 and method that enables measuring usage metrics for digital content, such as digital music, which is useful for third party systems 22 and/or content providers 18, such as content publishers, content developers, the advertising industry and organizations who have pecuniary or other interests in products or services available with digital devices. The system 10 in accordance with embodiments of the present invention provides usage metrics data and insights into the consumption of content. Further, the usage data may be used by analysis systems, such as recommendation systems 20, to improve content and for creating new or innovative business solutions. The system 10 can also be used to identify emerging artists and classes of listeners, to obtain data on music played for the purposes of determining royalty payments, and for building user profiles. Further, time/date listening habits can be inferred from usage data, such as morning, afternoon, evening, night, day, weekends, weekdays, and holiday listening habits.

While particular embodiments have been described, alternatives, modifications, variations, improvements, and substantial equivalents that are or may be presently unforeseen may arise to applicants or others skilled in the art. Accordingly, the appended claims as filed, and as they may be amended, are intended to embrace all such alternatives, modifications, variations, improvements, and substantial equivalents. Further, the recited order of processing elements or sequences, or the use of numbers, letters, or other designations therefor, is not intended to limit the claimed processes to any order except as may be specified in the claims.

What is claimed is:

1. A system comprising:
    a first device configured to download purchased digital content, comprising:
        a digital content storage that stores digital content files;
        a monitoring system that monitors, at the first device, consumption of the purchased downloaded digital content of a file selected from the digital content storage, and generates usage data based on one or more usage events associated with the purchased downloaded digital content and indicative of the manner in which the purchased downloaded digital content is consumed;
        a usage data storage system on the first device that collects the usage data associated with the purchased downloaded digital content; and
        a usage metrics system at a second device remote from the first device that receives the stored usage data associated with the purchased downloaded digital content and processes the usage data to provide inference results, wherein the usage metrics system organizes the usage data into at least one of a plurality of categories comprising a genre type of digital content, time based consumption of the digital content and date based consumption of the digital content, and
    wherein said usage events include a play event type describing how the purchased downloaded digital content is consumed, the play event type includes each of begin, resume, complete, pause, error and cancel indicators, and a timestamp indicating when each play event type occurs.

2. The system as set forth in claim 1 wherein the first device obtains the digital content from a content provider.

3. The system as set forth in claim 1 further comprising a recommendation system that generates digital content recommendations based on the processed usage data, the recommendation system providing the digital content recommendations to a content provider.

4. The system as set forth in claim 3 wherein the content provider selects additional digital content to send to the first device based on the digital content recommendations.

5. The system as set forth in claim 1 wherein the usage metrics system provides the processed usage data to at least one organization system comprising at least one of a content publisher, content developer, advertisement company, music chart company, music marketing company, marketing company and consulting firm.

6. The system as set forth in claim 1 wherein the digital content comprises at least one of digital music, digital documents, digital movies, and software.

7. A method comprising:
  storing at least one digital content file in a memory of a first device, the digital content file being downloaded to the first device after a purchase of the digital content file;
  monitoring, by the first device, consumption of the purchased downloaded digital content of the stored digital content files, which are selected from a digital content storage for consumption;
  at the first device, generating usage data associated with the purchased downloaded digital content based on one or more usage events and indicative of the manner in which the digital content is consumed;
  collecting and storing the usage data;
  transmitting the stored usage data to a second device remote from the first device; and
  receiving from a usage metrics system in the second device processed usage data to provide inference results, wherein the processed usage data is generated by organizing the usage data into at least one of a plurality of categories comprising a genre type of digital content, time based consumption of the digital content and date based consumption of the digital content, and
  wherein said usage events include a play event type describing how the purchased downloaded digital content is consumed, the play event type includes each of begin, resume, complete, pause, error and cancel indicators, and a timestamp indicating when each play event type occurs.

8. The method as set forth in claim 7 further comprising obtaining the digital content at the first device from a content provider.

9. The method as set forth in claim 7 further comprising generating digital content recommendations based on the processed usage data.

10. The method as set forth in claim 9 further comprising selecting additional digital content to send to the first device based on the digital content recommendations.

11. The method as set forth in claim 7 further comprising providing the processed usage data to at least one organization system comprising at least one of a content publisher, content developer, advertisement company, music chart company, music marketing company, marketing company and consulting firm.

12. A computer-readable medium having instructions stored thereon, which when executed by at least one processor, causes the at least one processor to perform:
  storing at least one digital content file in a memory of a first device, the digital content file being downloaded to the first device after a purchase of the digital content file;
  monitoring, by the first device, consumption of the purchased downloaded digital content of the stored digital content files, which are selected from a digital content storage for consumption;
  at the first device, generating usage data associated with the purchased downloaded digital content based on one or more usage events and indicative of the manner in which the digital content is consumed;
  collecting and storing the usage data;
  transmitting the stored usage data to a second device remote from the first device; and
  receiving from a usage metrics system in the second device processed usage data to provide inference results, wherein the processed usage data is generated by organizing the usage data into at least one of a plurality of categories comprising a genre type of the purchased downloaded digital content, a time based consumption of the downloaded digital content and a date based consumption of the purchased downloaded digital content, and
  wherein said usage events include a play event type describing how the purchased downloaded digital content is consumed, the play event type includes each of begin, resume, complete, pause, error and cancel indicators, and a timestamp indicating when each play event type occurs.

13. The medium as set forth in claim 12 further comprising obtaining the digital content at the first device from a content provider.

14. The medium as set forth in claim 12 further comprising generating digital content recommendations based on the inference results.

15. The medium as set forth in claim 14 further comprising selecting additional digital content to send to the first device based on the digital content recommendations.

16. The medium as set forth in claim 12 further comprising providing the processed usage data to at least one organization system comprising at least one of a content publisher, content developer, advertisement company, music chart company, music marketing company, marketing company and consulting firm.

17. The system as set forth in claim 1, wherein the usage data storage system is located in a portable digital audio player.

18. The system as set forth in claim 1, wherein the first device is a portable device and the usage storage system is located in a computer.

19. The system as set forth in claim 1, wherein the inference results include at least one inference of preference of a consumer of the digital content.

20. The system as set forth in claim 1, wherein the inference results include at least one inference of habit of a consumer of the digital content.

21. The method as set forth in claim 7, wherein the inference results include at least one inference of preference of a consumer of the digital content.

22. The method as set forth in claim 7, wherein the inference results include at least one inference of habit of a consumer of the digital content.

23. The computer-readable medium as set forth in claim 12, wherein the inference results include at least one inference of preference of a consumer of the digital content.

24. The computer-readable medium as set forth in claim 12, wherein the inference results include at least one inference of habit of a consumer of the digital content.

* * * * *